United States Patent [19]

Mohebban et al.

[11] Patent Number: 5,066,104
[45] Date of Patent: Nov. 19, 1991

[54] LIQUID CRYSTAL ELECTRICAL FAULT INDICATORS

[75] Inventors: Manoochehr Mohebban, Foster City; Wayne Montoya, Newark; Robert Parker, Alamo; Dennis C. Siden, Portola Valley, all of Calif.

[73] Assignee: Raychem Corporation, Menlo Park, Calif.

[21] Appl. No.: 173,407

[22] Filed: Mar. 25, 1988

[51] Int. Cl.$^5$ ............................................. G02F 1/13
[52] U.S. Cl. ...................................... 359/43; 359/51; 359/104; 359/84; 324/501
[58] Field of Search ............ 350/331 R, 331 T, 350 S, 350/351, 346, 349

[56] References Cited

U.S. PATENT DOCUMENTS

| | | | |
|---|---|---|---|
| 3,861,029 | 1/1975 | Johannsen et al. | 219/544 |
| 4,006,414 | 2/1977 | Parker | 350/351 |
| 4,177,376 | 12/1979 | Horsma et al. | 219/553 |
| 4,177,446 | 12/1979 | Diaz | 219/528 |
| 4,237,441 | 12/1980 | Van Konynenburg et al. | 338/225 |
| 4,238,812 | 12/1980 | Middleman et al. | 219/505 |
| 4,317,027 | 2/1982 | Middleman et al. | 219/505 |
| 4,388,607 | 6/1983 | Toy et al. | 219/553 |
| 4,426,633 | 1/1984 | Taylor | 338/25 |
| 4,435,047 | 3/1984 | Fergason | 350/334 |
| 4,634,835 | 1/1987 | Suzuki | 350/351 |
| 4,675,699 | 6/1987 | Kan et al. | 350/351 |
| 4,689,475 | 8/1987 | Kleiner et al. | 219/553 |
| 4,763,992 | 8/1988 | Takada et al. | 350/350 S |

FOREIGN PATENT DOCUMENTS 0204537 12/1986 European Pat. Off. .

Primary Examiner—Stanley D. Miller
Assistant Examiner—Trong Phan
Attorney, Agent, or Firm—Yuan Chao; Herbert G. Burkard

[57] ABSTRACT

An electrical apparatus having a liquid crystal fault indicator, comprising: an electrical component subject to electrical fault; a smectic liquid crystal display having an indicating element having a first and a second visual state, said indicating element being capable of transitioning from the first to the second visual state upon the application of an electric field sufficient to realign the smectic liquid crystal material contained therein and remaining in the second visual state after the removal of the electric field and further being capable of transitioning from the second to the first visual state upon heating to at least a delatching temperature Td sufficient to destroy the electric field induced alignment of the smectic liquid crystals; and fault signal means for providing, upon the occurrence of a fault, a prescribed input sufficient to cause said indicating element to transition from a visual state indicative of an unfaulted condition to a visual state indicative of a faulted condition.

18 Claims, 6 Drawing Sheets

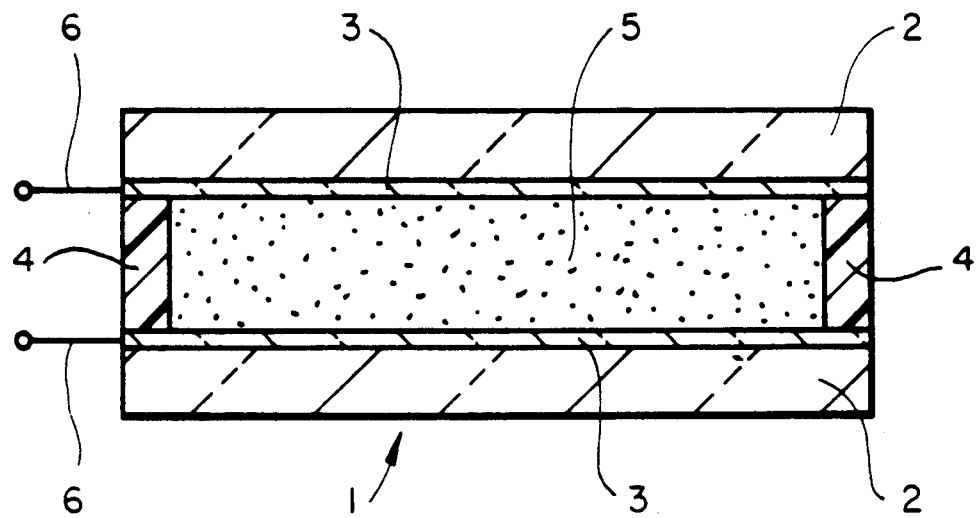
FIG_1
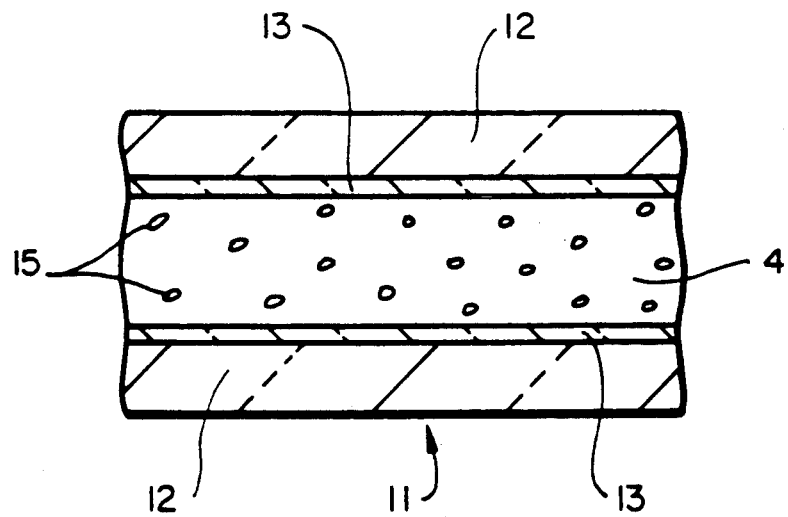
FIG_2

REFERENCE INDICATING
*FIG_3a*
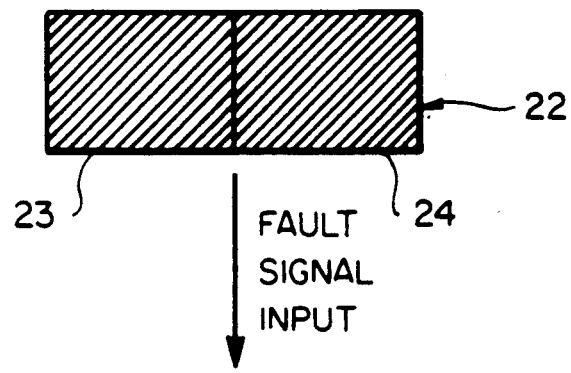
↓ FAULT SIGNAL INPUT
*FIG_3b*
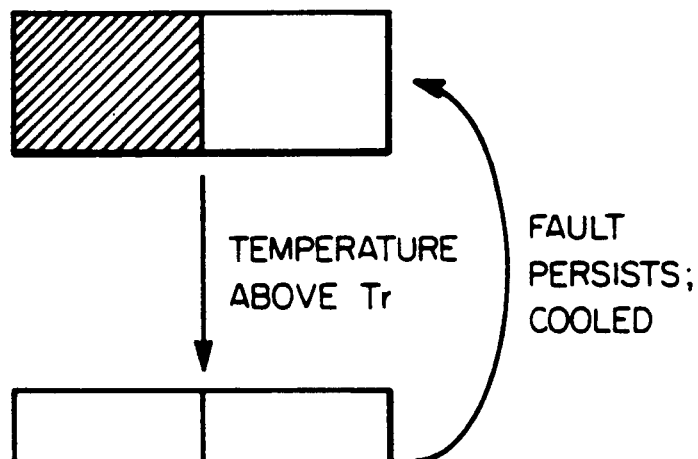
↓ TEMPERATURE ABOVE Tr
FAULT PERSISTS; COOLED
*FIG_3c*
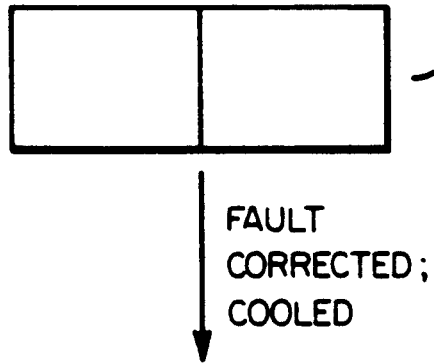
↓ FAULT CORRECTED; COOLED
*FIG_3d*
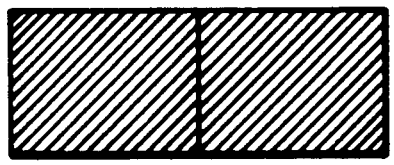
*FIG_3*

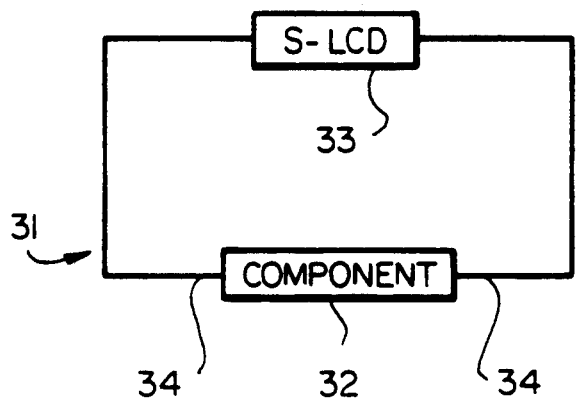
FIG_4
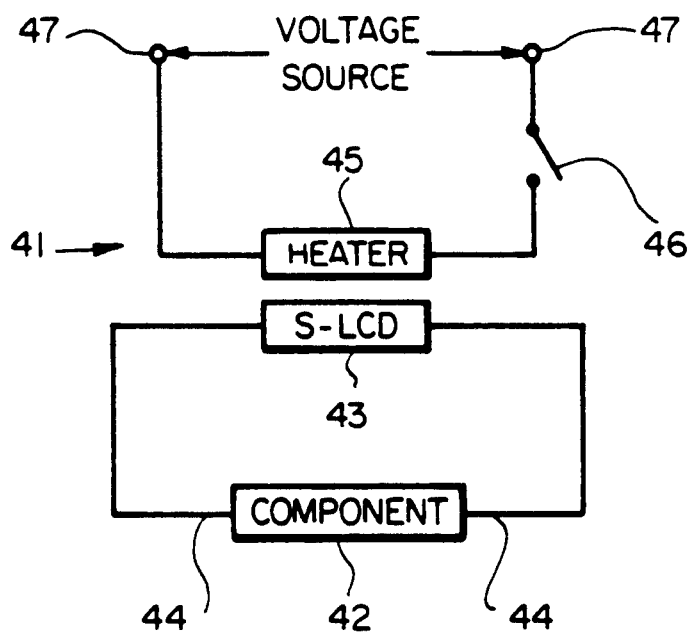
FIG_5

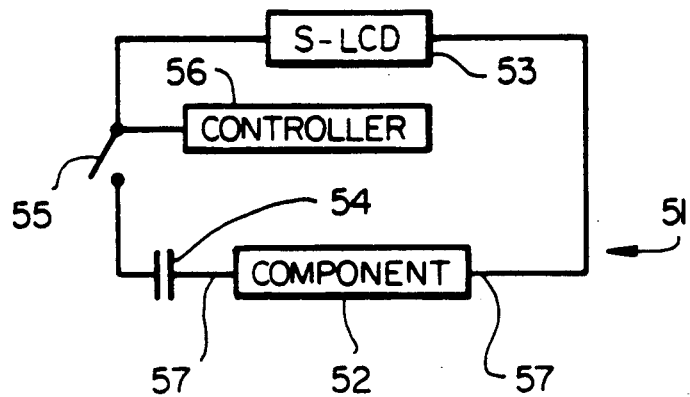
FIG_6
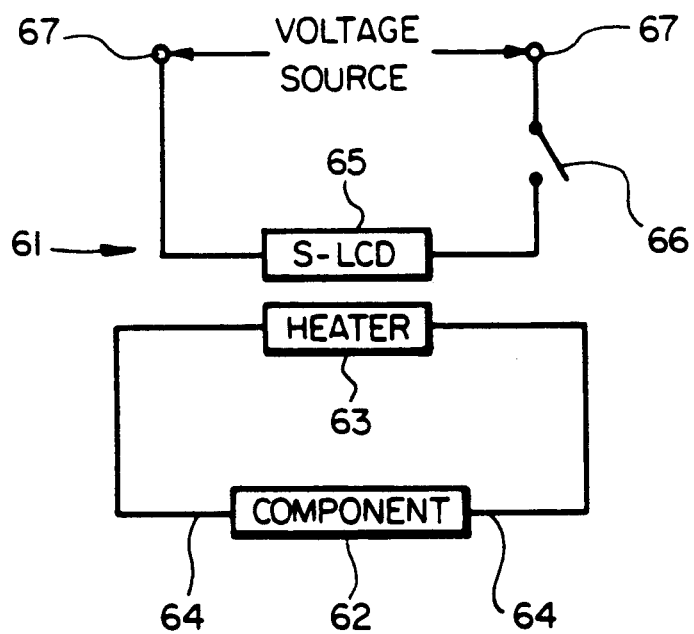
FIG_7

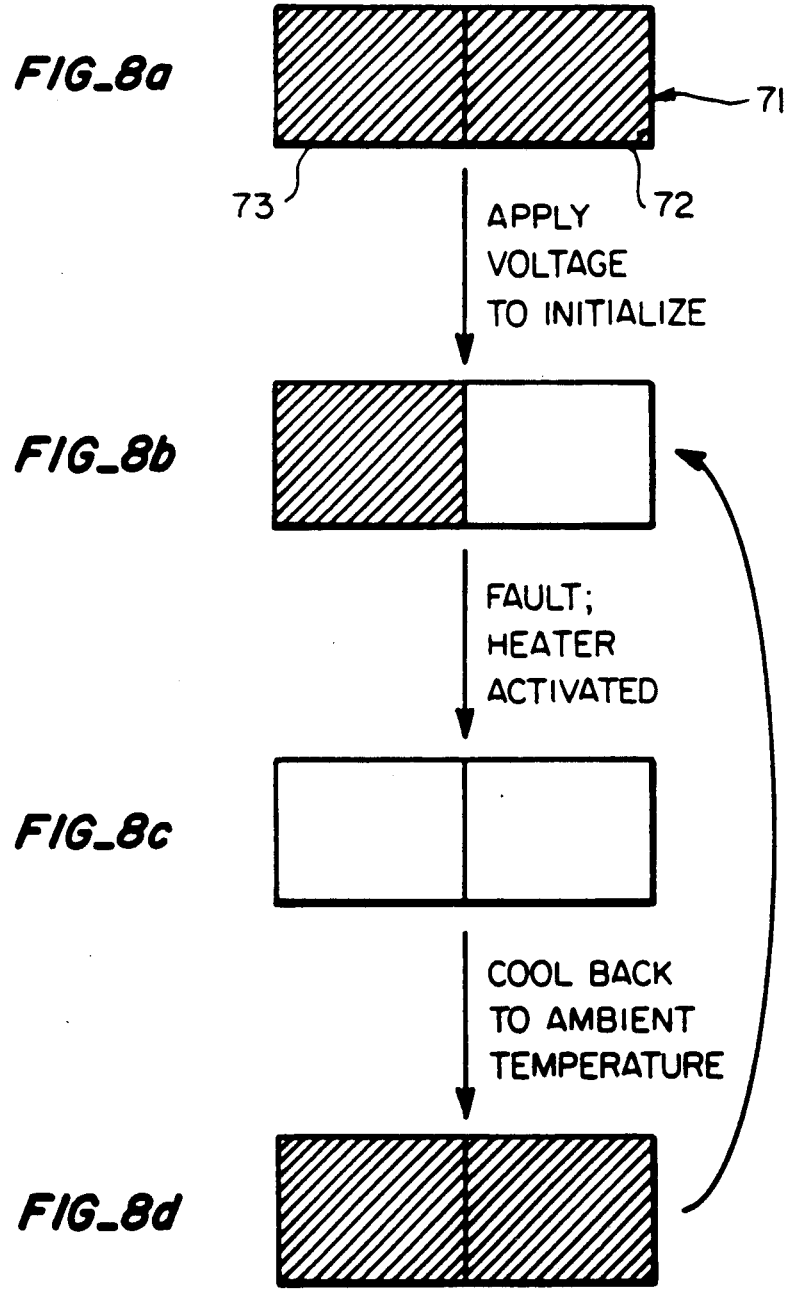
FIG_8

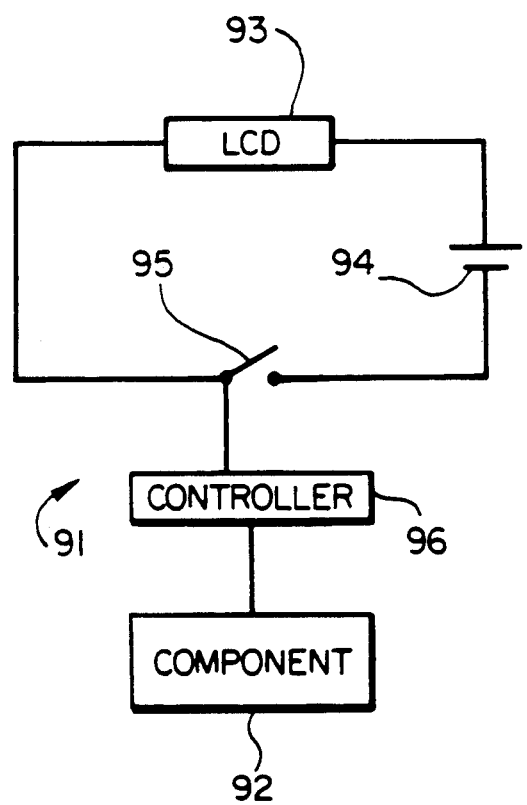
FIG_9

LIQUID CRYSTAL ELECTRICAL FAULT INDICATORS

BACKGROUND OF THE INVENTION

This invention relates to the indication of electrical faults with liquid crystal displays, in particular with smectic liquid crystal displays.

Electrical fault indicators are commonly of the electromechanical type. Such indicators may not be suitable for certain applications where compactness, light-weightness, ease of resetting, and/or durability are important considerations. For example, in the electronics industry, it may be desirable to monitor the state of individual electrical components in complex electrical equipment such as a computer, in order to facilitate trouble-shooting.

The present invention provides liquid crystal fault indicators for electrical apparatuses.

SUMMARY OF THE INVENTION

This invention provides an electrical apparatus having a liquid crystal fault indicator, comprising:

an electrical component subject to electrical fault;

a smectic liquid crystal display having an indicating element having a first and a second visual state, said indicating element being capable of transitioning from the first to the second visual state upon the application of an electric field sufficient to realign the smectic liquid crystal material contained therein and remaining in the second visual state after the removal of the electric field and further being capable of transitioning from the second to the first visual state upon heating to at least a delatching temperature $T_d$ sufficient to destroy the electric field induced alignment of the smectic liquid crystals; and fault signal means responsive to the fault state of said electrical component and capable of providing, upon the occurrence of a fault, a prescribed input sufficient to cause said indicating element to transition from a visual state indicative of an unfaulted condition to a visual state indicative of a faulted condition.

In a first preferred embodiment, the first visual state of said indicating element is indicative of an unfaulted condition; the second visual state of said indicating element is indicative of a faulted condition; said fault signal means is an electrical connection between said liquid crystal display and said electrical component; and the prescribed input is an electrical signal capable of applying an electric field to said indicating element sufficient to cause said indicating element to transition from its first to its second visual state. The apparatus of the first preferred embodiment may further comprises a switchable heater located proximately to said indicating element and capable of generating sufficient heat to raise the temperature of said indicating element to at least equal to $T_d$. The apparatus of the first preferred embodiment may further comprise a capacitor; a switch; and a controller means for keeping said switch open so long as a predetermined condition is not satisfied and closing said switch when the predetermined condition is satisfied; said capacitor and said switch being electrically connected in series with said electrical component and said liquid crystal display, such that an electric signal from said electrical component passes through said capacitor before reaching said switch.

In a second preferred embodiment, the first visual state of said indicating element is indicative of a faulted condition; the second visual state of said indicating element is indicative of an unfaulted condition; said fault signal means is an electric heater electrically connected to said electrical component such that said heater is powered upon the occurrence of a fault and located proximately to said indicating element; and the prescribed input is thermal energy sufficient to heat said indicating element to a temperature at least equal to $T_d$, and said apparatus further comprises switchable electrical means for applying an electric field to said indicating element sufficient to cause said indicating element to transition from its first to its second visual state.

In a third preferred embodiment, the liquid crystal display further comprises a reference element located proximately to said indicating element, said reference element having the same visual appearance as the first visual state of said indicating element and being unresponsive to the application of an electric field sufficient to cause said indicating element to transition from its first to its second visual state.

This invention further provides another electrical apparatus having a liquid crystal fault indicator, comprising:

an electrical component subject to electrical fault;

a liquid crystal display having an indicating element having a first visual state indicative of an unfaulted condition and a second visual state indicative of a faulted condition and being responsive to an applied electric field such that in the absence of the electric field said indicating element is in its first visual state and in the presence of the electric field said indicating element is in its second visual state;

a battery for providing the electric field;

a switch forming an electrical circuit with said liquid crystal display and said battery, the circuit being opened and closed via said switch;

a controller controlling said switch and responsive to the fault state of said electrical component such that said controller keeps said switch open in the absence of a fault and closes said switch upon the occurrence of a fault.

This invention further provides a method of monitoring the fault state of an electrical apparatus, comprising:

providing an electrical apparatus having an electrical component subject to electrical fault;

providing a smectic liquid crystal display having an indicating element having a first and a second visual state, said indicating element being capable of transitioning from the first to the second visual state upon the application of an electric field sufficient to realign the smectic liquid crystal material contained therein and remaining in the second visual state after the removal of the electric field and further being capable of transitioning from the second to the first visual state upon heating to at least a delatching temperature $T_d$ sufficient to destroy the electric field induced alignment of the smectic liquid crystals; and providing fault signal means responsive to the fault state of said electrical component and capable of providing, upon the occurrence of a fault, a prescribed input sufficient to cause said indicating element to transition from a visual state indicative of an unfaulted condition to a visual state indicative of a faulted condition;

observing the visual state of said indicating element in said liquid crystal display.

This invention provides yet another method of monitoring the fault state of an electrical apparatus, comprising:

providing an electrical apparatus having an electrical component subject to electrical fault;

providing a liquid crystal display having an indicating element having a first visual state indicative of an unfaulted condition and a second visual state indicative of a faulted condition and being responsive to an applied electric field such that in the absence of the electric field said indicating element is in its first visual state and in the presence of the electric field said indicating element is in its second visual state; said liquid crystal display forming an electrical circuit with a battery capable of providing the electric field and a switch, the circuit the circuit being opened and closed via said switch;

providing a controller controlling said switch and responsive to the fault state of said electrical component such that said controller keeps said switch open in the absence of a fault and closes said switch upon the occurrence of a fault;

observing the visual state of said indicating element in said liquid crystal display.

BRIEF DESCRIPTION OF THE DRAWINGS

FIG. 1 depicts a smectic liquid crystal display suitable for use as a fault indicator according to this invention.

FIG. 2 depicts an encapsulated smectic liquid crystal display suitable for use as a fault indicator according to this invention.

FIG. 3 (a-d) depicts schematically the operation of a smectic liquid crystal display of this invention having an indicating and a reference element.

FIG. 4 depicts an apparatus of this invention having a smectic liquid crystal display fault indicator, wherein an opaque appearance in the indicating element corresponds to an unfaulted condition and a transparent appearance in the indicating element corresponds to a faulted condition.

FIG. 5 depicts an apparatus according to FIG. 4 further having a heater for resetting the indicating element.

FIG. 6 depicts an apparatus according to this invention having a delayed trip feature for the liquid crystal fault indicator.

FIG. 7 depicts an apparatus of this invention having a smectic liquid crystal display fault indicator, wherein an opaque appearance in the indicating element corresponds to a faulted condition and a transparent appearance in the indicating element corresponds to an unfaulted condition.

FIG. 8 (a-d) depicts schematically the operation of a liquid crystal fault indicator according to FIG. 6, further having a reference element.

FIG. 9 depicts an apparatus of this invention in which a non-latching liquid crystal display may be used.

DESCRIPTION OF PREFERRED EMBODIMENTS

Liquid crystal displays (LCD's) are well known in the art. They range from the popular twisted nematic display to encapsulated liquid crystal displays, such as described by Fergason in U.S. Pat. No. 4,435,047 (1984). LCD's can transition from a first visual state to a second visual state upon the application of a prescribed input, typically an electric field, although it may also be a magnetic field or thermal or mechanical energy. For example, the first state may be black or dark colored and the second state may be white or light colored, or vice-versa. Or, the two states may be transparent or opaque, thereby permitting or not permitting a background color to be seen. Physically, this transition is associated with a realignment of the liquid crystal molecules induced by the prescribed input.

In LCD's made from nematic liquid crystals, the display reverts automatically from the second state to the first state upon removal of the electric field, because the nematic liquid crystal molecules then return to their original alignment. Conversely, smectic liquid crystals have the characteristic of not only realigning themselves in response an applied electric field, but also of remaining in that new alignment even after the removal of the electric field. It is believed that this characteristic is related to the higher degree of order and, hence, thermodynamic stability, of smectic liquid crystalline phases. As a result, a smectic liquid crystal display (S-LCD) transitions from its first visual state to its second state and remains there even after the input is removed—that is, it stays "latched." The smectic liquid crystal can be returned to its first visual state alignment by heating it to a sufficiently high temperature to destroy the electric field induced alignment—that is, it can be "delatched" by heat. The temperature above which the S-LCD is delatched is referred to herein as its delatching temperature ($T_d$), and may be related to a transition in the liquid crystals, such as a smectic-to-isotropic or smectic-to-nematic transition. (While above $T_d$, an S-LCD momentarily retains its second visual state appearance, but reverts to its first visual state appearance upon cooling to ambient temperature.)

Because a faulted condition in an electrical component does not always manifest itself with continuous signals such as constant overheating, overvoltage, or excessive current consumption, but may instead manifest itself only once, for example as a single current surge or voltage spike, S-LCD's are particularly desirable as indicators for electrical faults. They can respond to the fault signal and latch, thereby continuing to indicate the occurence of a fault even if the signal does not recur. An operator can then note the event and take proper corrective action, even though he or she was not present at the moment the fault occurred.

FIG. 1 depicts an S-LCD, designated by the numeral 1, suitable for fault indication. S-LCD 1 has opposing substrates 2, which can be made of glass or a polymer such as poly(ethylene terephthalate) (PET) and the interior surfaces of which are coated with layers 3 of a transparent conductor, such as indium tin oxide (ITO). Substrates 2 are separated from each other by sealer/spacers 4, and the resulting interior volume is filled with smectic liquid crystal material 5. Leads 6 connect S-LCD 1 to an appropriate voltage source (not shown), which when the S-LCD is being used to indicate a fault, could be the fault signal leads from the electrical component being monitored.

A preferred S-LCD for the instant invention uses encapsulated smectic liquid crystals, in which an encapsulating medium confines the smectic liquid crystal material in discrete volumes and induces a generally distorted alignment of the smectic liquid crystals. Accordingly, such a S-LCD is hereinafter referred to as an "encapsulated smectic liquid crystal display" (ES-LCD). In response to this alignment, incident light is scattered and/or absorbed, causing the ES-LCD to appear opaque. When a prescribed input—typically, an electric field—is applied, a realignment of the smectic liquid crystals is induced, and the amount of such scattering and/or absorption is reduced, causing the ES-LCD to appear transparent (or less opaque). The ES-LCD remains latched in this transparent/less opaque state even after removal of the electric field, until delatched by heating to above the $T_d$. FIG. 2 depicts in partial cross-section an ES-LCD 11. ES-LCD 11 has opposing substrates 12, which are preferably PET and the interior surfaces of which are coated with layers 13 of a transparent conductor, preferably ITO. The interior volume is filled with an encapsulant 14 encapsulating smectic liquid crystals 15. The transparent conductor layers are connected by leads (not shown) to an appropriate voltage source (also not shown). For fault indication, the voltage source could be the fault signal leads from the component being monitored.

The preparation of ES-LCD's is described by Pearlman et al. in published application EP 204,537 (1986), the disclosure of which is incorporated herein by reference.

In another preferred embodiment, a S-LCD of this invention comprises both an indicating element and a reference element located proximately thereto. The indicating element is active, that is, it responds like one of the S-LCD's described hereinabove to an electric field. The reference element is constructed similarly to the indicating element, except that it is inactivated, for example, by not connecting its leads to the component's fault signal leads or by omitting one or more layers of the transparent conductor therefrom, so that it will not transition to a second visual state upon application of an electric field but instead will retain its first visual appearance. When the indicating element transitions to its second state, the presence of the proximate reference element having a first-state appearance permits ready visual comparison and confirmation that the indicating element has indeed tripped and latched and that a fault has occurred. This and another advantage of this embodiment are shown schematically in FIG. 3.

FIG. 3 depicts a S-LCD 21 having an indicating element 22 and a reference element 23. In FIG. 3a both elements 22 and 23 are shown in their first states, corresponding to an unfaulted condition—that is, both are opaque. When a fault occurs, the fault signal applies an electric field to S-LCD 21 causing indicating element 22 to transition to its second visual state (transparent), which is readily discernible by comparison with the opaque appearance of reference element 23, as shown in FIG. 3b. If, however, the ambient temperature is momentarily above the delatching temperature $T_d$, for example because the apparatus being monitored is operating in a hot environment, reference element 23 will also go clear. Then both elements 22 and 23 will appear clear, as shown in FIG. 3c. This will serve to warn an operator that the clear appearance of indicating element 22 is not necessarily indicative of a faulted condition. Only if elements 22 and 23 revert upon cooling to the appearance shown in FIG. 3b should the occurrence of a fault be diagnosed. Thus, the possibility of a "false positive" fault diagnosis is avoided. Of course, if both elements are heated above $T_d$ for the purpose of resetting after the correction of a fault situation, then upon cooling they will revert to their initial appearance, that is, both opaque, as shown in FIG. 3d.

Those skilled in the art will appreciate that while in FIG. 3 the reference and indicating elements have been depicted as identical in size and touching each other, these features are not a requirement for obtaining the advantages of this preferred embodiment. The two elements may be of different sizes and shapes, for example a reference element surrounding the indicating element or vice-versa. The two elements may also be apart from each other, provided the gap between them is not so large so as to preclude effective visual comparison between them.

FIG. 4 shows an electrical apparatus 31 embodying the instant invention. Apparatus 31 has an electrical component 32 subject to electrical fault a S-LCD 33 connected thereto by leads 34. When there is a fault in component 32, an electrical fault signal sufficient to trip S-LCD 33 from its first to its second visual state is transmitted via leads 34, thereby latching it to show a faulted condition. Where S-LCD 33 is an ES-LCD, the tripping voltage is typically about 80 volts, although it may vary somewhat depending on contruction and materials. The instant invention is particularly useful where component 32 is a circuit board. In a circuit board, the compactness and lightweightness of a S-LCD fault indicator makes it especially desirable.

Heating a S-LCD above $T_d$ to delatch it may be accomplished in a number of ways. It may be done by heating the S-LCD with a hot air gun. In a preferred embodiment, delatching is accomplished by a switchable electric heater, as shown in FIG. 5. Apparatus 41 has an electrical component 42 subject to electrical fault and a S-LCD 43 connected thereto by leads 34, substantially as described in FIG. 4. Apparatus 41 further comprises a switchable electric heater 45 located proximately to S-LCD 43 and capable of producing sufficient heat to raise the temperature of S-LCD 43 to above its $T_d$. When it is desired to delatch S-LCD 43, switch 46 is closed, to power heater 45 from a suitable voltage source (not shown) by leads 47. After delatching S-LCD 43, switch 46 is reopened, turning off heater 45.

Preferably, the heating element in the heater is made of a material comprising an organic polymer having electrically conductive particulate fillers therein. More preferably, this material has a positive temperature coefficient (PTC) of resistance, by which is meant it experiences a substantial increase in resistance to conductivity as it attains a certain temperature (or temperature range), known as the switching or anomaly temperature $T_s$. Beyond $T_s$ resistance in the material can become so high that any current flow through the material is effectively switched off. In practical terms, then, $T_s$ represents the maximum temperature obtainable by a PTC material in response to current flow therethrough, and heating elements constructed from PTC material consequently exhibit inherent self-regulation with respect to temperature. This self-regulation feature helps prevent damage to the S-LCD due to overheating during delatching. The preparation of heaters having heating elements made of PTC or other conductive polymeric materials is described in Smith-Johannsen et al., U.S. Pat. No. 3,861,029 (1975); Horsma et al., U.S. Pat. No. 4,177,376 (1979); Diaz et al., U.S. Pat. No. 4,177,446 (1979); Toy et al., U.S. Pat. No. 4,388,607 (1983); van Konynenberg et al., U.S. Pat. No. 4,237,441 (1980); Middleman et al., U.S. Pat. No. 4,238,812 (1980); Middleman et al., U.S. Pat. No. 4,317,027 (1982); Taylor et al., U.S. Pat. No. 4,426,633 (1984); Matthieson, U.S. Pat. No. 4,689,475 (1987); and copending, commonly assigned application Ser. No. 119,618, filed Nov. 12, 1987, of Parker.

To ensure efficient heat transfer, the heater may be placed in direct contact with the S-LCD, for example by lamination, or adhesively bonded thereto.

It is not always desirable to have a fault indicator trip as soon as a fault signal is generated. For example, the apparatus being monitored may be operating at a temperature above the delatching temperature $T_d$ of the smectic liquid crystals, in which case immediate tripping of the S-LCD would only lead to its delatching almost immediately thereafter. In such instances, it may be desirable to delay the tripping of the S-LCD until the conditions are more appropriate, for example as when the system has cooled down to below the $T_d$. An embodiment of the invention in which such delayed tripping is accomplished is shown in FIG. 6. Apparatus 51 comprises, as before, an electrical component 52 subject to electrical fault and a S-LCD 53. However, instead of being directly connected to each other through leads 57, there is interposed between them a capacitor 54 and a switch 55. Controller 56 controls switch 55 and senses whether a predetermined condition is satisfied—for example, that the temperature of the apparatus is below $T_d$. If the condition is not satisfied, controller 56 keeps switch 55 open; if the condition is satisfied, controller 56 closes switch 55. In other words, switch 55 is conditional—it closes only when the predetermined condition is satisfied. If a fault occurs while switch 55 is open, the resulting fault signal will not cause S-LCD 53 to transition from its first to its second visual state, but, instead, will merely charge up capacitor 54. However, if at a later time the condition is satisfied and switch 55 closes, the capacitor will discharge, in the process applying an electric field to S-LCD 53 and causing it to transition from its first to its second visual state and indicate the occurrence of a fault. An example of a preferred switch 55 is an electromagnetic switch.

While generally it is more convenient to have the first visual state in the S-LCD indicate an unfaulted condition and the second visual state indicate a faulted condition, this is not essential. FIG. 7 describes an embodiment of the invention in which the reverse occurs. Apparatus 61 comprises fault-susceptible electrical component 62, heater 63 connected thereto through leads 64, and S-LCD 65 located proximately to heater 63. Switch 66 controls the connection of S-LCD 65 to a voltage source via leads 67. S-LCD 65 is initialized by momentarily closing switch 66, causing it to transition from its first to its second visual state. Heater 63, which is of sufficient wattage to heat S-LCD 65 to above its $T_d$, is normally unpowered, so that the second visual state corresponds to an unfaulted condition of component 62. However, if there is a fault, heater 63 is powered via leads 64 for a period of time sufficient to heat S-LCD 65 above its $T_d$, thereby causing to delatch and assume its first visual state. Thus, in this embodiment, a faulted condition is indicated by the first visual state. After correction of the fault situation, S-LCD 65 is reset by closing switch 66.

The embodiment of FIG. 7 can further have a reference element in the S-LCD, such as described above. Then it would operate schematically as shown in FIG. 8. S-LCD 71 comprises an indicating element 72 and a reference element 73. FIG. 8a shows both elements in their first visual states (both opaque). Indicating element 72 is initialized by applying an electric field it, leading to the appearance of FIG. 8b, in which reference element 73 is in a first visual state appearance but indicating element 72 is in its second visual state. This is the unfaulted appearance of S-LCD 71. If a fault occurs, the heater is activated, heating both elements 72 and 73 to above the $T_d$, and causing both of them to momentarily go clear, as shown in FIG. 8c. Upon cooling back to ambient temperature, both elements turn opaque, producing the appearance shown in FIG. 8d and indicating the occurrence of a fault. After correction of the fault situation, S-LCD 71 can be reset to the appearance of FIG. 8b with an electric field.

Liquid crystal fault detectors of this invention are not limited to those employing smectic liquid crystals. While the latching characteristic of S-LCD's is advantageous, nonlatching LCD's, preferably twisted nematic LCD's (TN-LCD's), can also be used for fault indication. Although they do require a continuous voltage source to maintain them in the visual state indicating a faulted condition, TN-LCD's, being field effect devices, consume very little power and can be maintained in the fault-indicating condition for very long periods of time with small and inexpensive batteries, such as the type used in hearing aids or cameras.

FIG. 9 depicts an electrical apparatus 91 having an electrical component 92 subject to electrical fault and a nonlatching LCD 93 as a fault indicator. Battery 94 supplies the voltage for causing TN-LCD 93 to transition from its first visual state, indicative of an unfaulted condition, to its second visual state, indicative of a faulted condition, and maintaining it in the latter state. Switch 95, which opens and closes the TN-LCD 93/battery 94 circuit, is controlled by controller 96 which is responsive to a fault signal from component 92. Controller keeps switch 95 open in the absence of a fault signal, but, upon receipt of a fault signal, causes switch 95 to close, in turn causing LCD 93 to transition from its visual state indicative of an unfaulted condition to that indicating a faulted condition. Switch 95 may be, for example, an electromagnetic switch.

It is further noted that the general scheme of FIG. 9 is also applicable to latching LCD's such as S-LCD's, since although they do not require a continuously impressed voltage to maintain them in the fault-indicating state, the presence of such a voltage is not incompatible with its being in the fault-indicating state.

I claim:

1. An electrical apparatus having a liquid crystal fault indicator, comprising:

an electrical component subject to electrical fault;

a smectic liquid crystal display having an indicating element having a first and second visual state, said indicating element being capable of transitioning from the first to the second visual state upon the application of an electrical field sufficient to realign the smectic liquid crystal material contained therein and remaining in the second visual state after the removal of the electrical field and further being capable of transitioning from the second to the first visual state upon heating to at least a delatching temperature $T_d$ sufficient to destroy the electric field induced alignment of the smectic liquid crystals and to cause the indicating element to revert to its first visual state upon cooling to ambient temperature; and fault signal means in the form of an electrical connection between said liquid crystal display and said electrical component and responsive to the fault state of said electrical component and capable of providing, upon the occurrence of a fault, an electrical signal sufficient to cause said indicating element to transition from a visual state indicative of an unfaulted condition to a visual state indicative of a faulted condition.

2. An apparatus according to claim 1 wherein
the first visual state of said indicating element is indicative of an unfaulted condition; and
the second visual state of said indicating element is indicative of a faulted condition.

3. An apparatus according to claim 2 further comprising a switchable heater located proximately to said indicating element and capable of generating sufficient heat to raise the temperature of said indicating element to at least equal to $T_d$.

4. An apparatus according to claim 3 wherein the heating element of said heater comprises a material comprising an organic polymer having electrically conductive particulate fillers therein.

5. An apparatus according to claim 4 wherein said material has a positive temperature coefficient of resistance.

6. An apparatus according to claim 2, further comprising
a capacitor;
a switch; and
a controller means for keeping said switch open so long as a predetermined condition is not satisfied and closing said switch when the predetermined condition is satisfied;
said capacitor and said switch being electrically connected in series with said electrical component and said liquid crystal display, such that an electric signal from said electrical component passes through said capacitor before reaching said switch.

7. An apparatus according to claim 6, wherein said switch is an electromagnetic switch.

8. An electrical apparatus according to claim 1, 2, or 6; wherein said liquid crystal display further comprises a visual reference element located proximately to said indicating element, said visual reference element having the same visual appearance as the first visual state of said indicating element and being unresponsive to the application of an electric field sufficient to cause said indicating element to transition from its first to its second visual state.

9. An electrical apparatus according to claim 1, 2, or 6, wherein said smectic liquid crystal display is uses encapsulated smectic liquid crystals.

10. An electrical apparatus according to claim 1, 2, or 6, wherein said electrical component is a circuit board.

11. An electrical apparatus having a liquid crystal fault indicator, comprising:
an electrical component subject to electrical fault;
a liquid crystal display having an indicating element having a first visual state indicative of an unfaulted condition and a second visual state indicative of a faulted condition and being responsive to an applied electric field such that in the absence of the electric field said indicating element is in its first visual state and in the presence of the electric field said indicating element is in its second visual state;
a battery for providing the electric field;
a switch forming an electrical circuit with said liquid crystal display and said battery, the circuit being opened and closed via said switch;
a controller controlling said switch and responsive to the fault state of said electrical component such that said controller keeps said switch open in the absence of a fault and closes said switch upon the occurrence of a fault.

12. An apparatus according to claim 11, wherein said liquid crystal display is a twisted nematic liquid crystal display.

13. An apparatus according to claim 11, wherein said electrical component is a circuit board.

14. A method of monitoring the fault state of an electrical apparatus, comprising:
providing an electrical apparatus having an electrical component subject to electrical fault;
providing a smectic liquid crystal display having an indicating element having a first and a second visual state, said indicating element being capable of transitioning form the first to the second visual state upon the application of an electrical field sufficient to realign the smectic liquid crystal material contained therein and remaining in the second visual state after the removal of the electrical field and further being capable of transitioning from the second to the first visual state upon heating to at least a delatching temperature $T_d$ sufficient to destroy the electric field induced alignment of the smectic liquid crystals and to cause the indicating element to revert to its first visual state upon cooling to ambient temperature;
providing fault signal means in the form of an electrical connection between said liquid crystal display and said electrical component and responsive to the fault state of said electrical component and capable of providing, upon occurrence of a fault, an electrical signal sufficient to cause said indicating element to transition from a visual state indicative of an unfaulted condition to a visual state indicative of a faulted condition; and
observing the visual state of said indicating element in said liquid crystal display.

15. A method according to claim 14, wherein
the first visual state of said indicating element is indicative of an unfaulted condition; and
the second visual state of said indicating element is indicative of a faulted condition.

16. A method according to claim 14, further comprising the step of providing, before said observing step:
a capacitor;
a switch; and
a controller means for keeping said switch open so long as a predetermined condition is not satisfied and closing said switch when the predetermined condition is satisfied;
said capacitor and said switch being electrically connected to series with said electrical component and said liquid crystal display, such that an electric signal from said electrical component passes through said capacitor before reaching said switch.

17. A method according to claim 14, 15, or 16, wherein said liquid crystal display further comprises a visual reference element located proximately to said indicating element, said visual reference element having the same visual appearance as the first visual state of said indicating element and being unresponsive to the application of an electric field sufficient to cause said indicating element to transition from its first to its second visual state.

18. A method of monitoring the fault state of an electrical apparatus, comprising:
providing an electrical apparatus having an electrical component subject to electrical fault;

providing a liquid crystal display having an indicating element having a first visual state indicative of an unfaulted condition and a second visual state indicative of a faulted condition and being responsive to an applied electric field such that in the absence of the electric field said indicating element is in its first visual state and in the presence of the electric field said indicating element is in its second visual state; said liquid crystal display forming an electrical circuit with a battery capable of providing the electric field and a switch, the circuit the circuit being opened and closed via said switch;

providing a controller controlling said switch and responsive to the fault state of said electrical component such that said controller keeps said switch open in the absence of a fault and closes said switch upon the occurrence of a fault;

observing the visual state of said indicating element in said liquid crystal display.

* * * * *